United States Patent [19]

Levko et al.

[11] Patent Number: 4,814,627

[45] Date of Patent: Mar. 21, 1989

[54] CABLE FUSE IDENTIFICATION SYSTEM

[75] Inventors: Fred Levko; Thomas P. Speas, Jr., both of Chesterfield, Mo.

[73] Assignee: Cooper Industries, Inc., Houston, Tex.

[21] Appl. No.: 124,233

[22] Filed: Nov. 23, 1987

[51] Int. Cl.[4] .......... G06K 7/10

[52] U.S. Cl. .......... 250/566; 209/583; 382/8

[58] Field of Search .......... 250/566, 568, 234–236, 250/555–557, 458.1, 459.1, 461.1, 340, 341; 382/8; 209/583, 587, 939, 576, 577; 455/605; 340/825.06, 825.1, 825.16; 324/501

[56] References Cited

U.S. PATENT DOCUMENTS

| | | | |
|---|---|---|---|
| 3,663,801 | 5/1972 | Wahli et al. | 250/566 |
| 4,531,061 | 7/1985 | Rabinow | 250/566 |
| 4,689,490 | 8/1987 | Thomas et al. | 250/566 |

OTHER PUBLICATIONS

Veritec, Inc., Advertising Material, "Covert Identification System—The Invisible Fingerprint TM"—at least as old as 4/7/88.

*Primary Examiner*—Edward P. Westin
*Assistant Examiner*—Charles Wieland
*Attorney, Agent, or Firm*—Nelson A. Blish; Eddie E. Scott; Alan R. Thiele

[57] ABSTRACT

A method and apparatus for detecting proper arrangements of fuses (10) in fuseblock (70). A scanner (80) detects a chemical material in fuse (10) and identifies the material and correlates the material to a proper amperage rating. The arrangements of different amperage rating fuses in the block is automatically compared to a standard by a microprocessor or computer to determine if fuse location is proper.

4 Claims, 2 Drawing Sheets

CABLE FUSE IDENTIFICATION SYSTEM

FIELD OF THE INVENTION

The present invention relates to fuses in general and in particular to a fuse identification system.

BACKGROUND OF THE INVENTION

Current practice in the automobile industry is to protect electrical and electronic equipment installed in automobiles by means of fuses located in the fuse block in the glove compartment or under the dashboard of the automobile. These fuses are, for the most part, relatively low amperage and are designed to protect apparatus such as radios, lights, and turn signals. Also, these fuses operate in a temperature controlled environment since they are inside the passenger compartment of a car.

Many of the major electrical loads in an automobile are found underneath the hood of a car, such as the starter, alternator, and the battery, to name several. These electrical apparatus draw relatively high currents compared to the typical fuse located under the dashboard. If these underhood electrical apparatus were to be protected by fuses mounted in the passenger compartment, the wiring connected to them would have to be routed through the firewall to the passenger compartment to the fuseblock and then back through the firewall to the component under the hood. This, of course, would add weight to the automobile, additional labor costs, and increase the cost of production. It is, therefore, desirable to locate some circuit protector under the hood of automobiles.

It is preferred to group these large automotive fuses together in one location under the hood in a fuseblock. Since different components under the hood of an automobile have different operating and starting characteristics, it follows, naturally, that fuses of different amp ratings and characteristics will be inserted in the fuseblock. However, in order to standardize the shape of the fuseblock so that it can be used in different model automobiles requiring different combinations of fuse ratings, the large automotive fuses have been standardized as to size and shape. Therefore, potential problems exists in that an improper rated fuse may be inserted out of order and open at too low a current or a fuse with too high a rating may be inserted in the improper order and not protect downstream components.

Manufacturers realizing that this is a problem have verified that fuses are inserted in the proper order by visually verifying location of fuses. However, this method is labor-intensive in that it requires an extra worker on the assembly line.

SUMMARY OF THE INVENTION

According to the present invention, a large automotive fuse is comprised of a metal element having a first and second terminal connected by a fusible element. The metal element of the automotive fuse is enclosed in aninsulating material made of transparent, high-temperature thermoplastic. The thermoplastic material is laser etched, to identify the amperage rating of the fuse, and incorporates trace elements of chemicals that are detectable by an automatic scanner. After the fuses have been automatically assembled in a fuseblock, the scanner automatically verifies, by detecting the trace elements in the thermoplastic material, that fuses of the proper rating are in the proper position in the fuseblock.

DETAILED DESCRIPTION OF THE DRAWING

Figure 1:
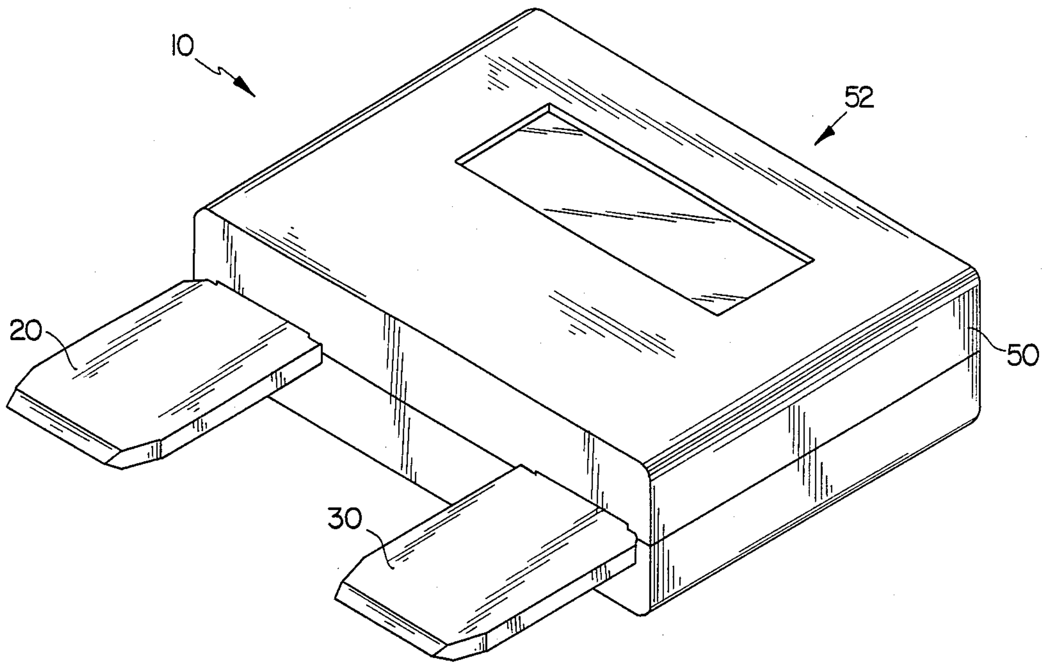
FIG. 1 is a perspective view of a large, automotive fuse according to the present invention.

A large, automotive fuse, shown in FIG. 1 is designated generally by the numeral 10. Fuse 10 is comprised of a one-piece metal element, not shown, and an insulating housing 50. The metal element is comprised of a first terminal 20 and a second terminal 30, connected by fusible element. The fusible element and the upper portions of first terminal 20 and second terminal 30 are encased in an insulating material 50.

Plastic casing 50 is made out of a transparent, high-temperature thermoplastic. The transparency allows visual faults in the elements to be readily detected. The high-temperature plastic will maintain structural integrity at elevated operating temperatures. Plastic casing 50 also incorporates chemical compounds which are added to the plastic during the molding process to identify the amperage rating of the fuse. The chemicals are identifiable by a scanner linked to a computer for identifying this certain combination of chemicals and, hence, the fuse amperage rating. In the preferred embodiment of the invention, proprietary chemicals available from Veritec, Inc., 23801 Calabasas Road, Suite 2039, Calabasas Park, Calif. 91302, were used.

Figure 2:
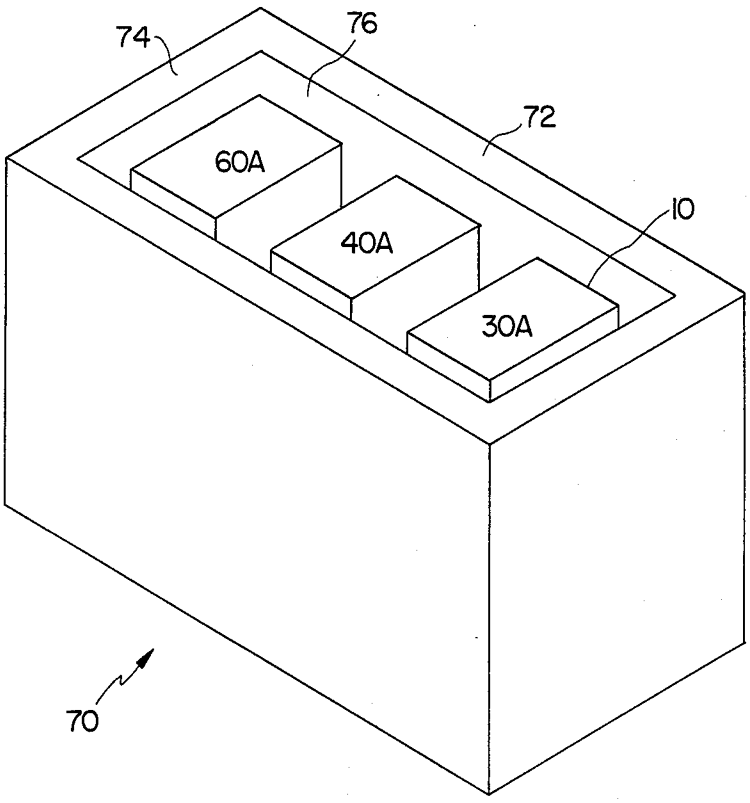
FIG. 2 is a perspective view of automotive fuses assembled in a fuseblock.

FIG. 2 shows fuses incorporated into a fuseblock. This drawing shows three fuses which is intended to be illustrative only since many more fuses may be incorporated into a fuseblock. Also, while these fuses are shown arranged in a front-to-back, single file sequence, other fuseblock arrangements are compatible with the present invention.

In the FIG. 2 fuseblock, block 70 is comprised of end walls 74 and side walls 72 joined to form a hollow, rectangular open area 76. Into this open area, fuses 10 are inserted into receptacles not shown. The order the fuses are inserted into the fuseblock are important if a fuse of an improper rating is used in the wrong location. Important electrical equipment may not be protected from overcurrent damage.

Since the fuses are inserted into a block mechanical, there is always the opportunity for error. Thus, the uses have to be checked in order to ensure the proper fuse is in the proper location.

Figure 3:
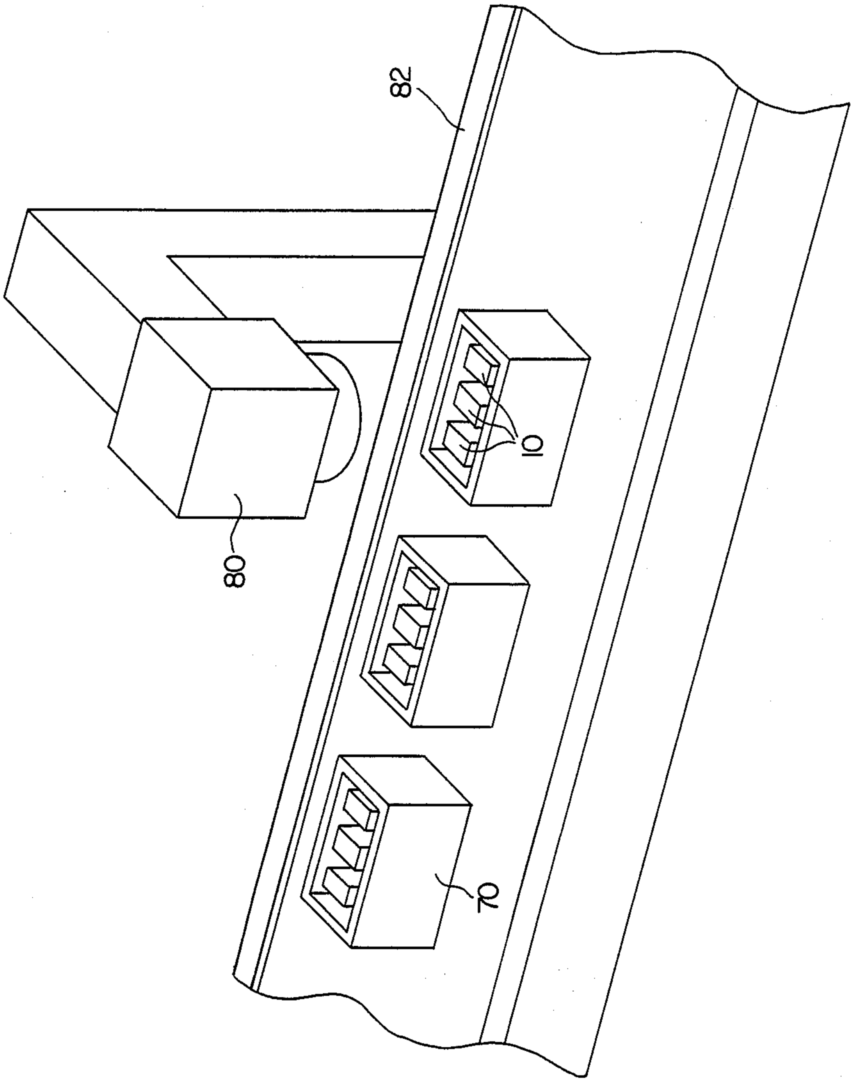
FIG. 3 is a perspective view of fuseblocks passing under a scanner according to the present invention.

FIG. 3 shows fuseblocks 70 on a conveyor belt 82 which moves from left to right. Scanner 80 mounted over conveyor belt 82 projects a beam of radiation at the fused blocks 70. The reflected light will vary depending on the presence or absence of the proprietary chemicals discussed above. A computer or microprocessor, not shown, may be incorporated directly into scanner 80 or not separately to compare the reflected light patterns from the fuses and fuseblock arrangement 70 to determine proper arrangement as it is well known in the art.

The fuses 10 are laser etched to provide identification of the amperage rating of the fuse on the top horizontal surface. The fuses may also be laser etched with the date or a code that can be used to determine the date of manufacture and, hence, provides a quality control on the manufacture of fuses and traceability for locating specific batches of fuses. Laser etching, rather than hot stamping or incorporating information in the mold, ensures a more durable marking system. Also using laser etching, the date inscribed on the fuse and other data may be changed on a routine basis, or even on a daily basis, which is not practical with hot stamping and other types of marking.

Although specific embodiments of the invention have been described above, those skilled in the arts will appreciate that the invention may be practiced in other manners than those shown. For example, the automotive fuse, other than being a blade-type plug-in fuse, may be incorporated into the electrical system by bolting, soldering, clamping, or other means.

We claim:

1. A fuse identification system comprising:

scanning means;

conveyor means for transporting a fuseblock past said scanning means;

a fuse having a material identifiable by said scanning means; and, mounted in a fuseblock.

2. A method of detecting proper arrangements of fuses in a fuseblock comprising:

applying a material specific to a particular fuse rating to a fuse;

inserting said fuse in a fuseblock;

transporting said fuseblock past a scanning means wherein said scanning means identifies the specific material in each fuseblock and automatically correlates a material with a specific amperage rating; and, location in said fuseblock.

3. A method as in claim 2 wherein said material is incorporated into a plastic compound which comprises the body of said fuse.

4. A method as in claim 2 wherein said material is applied to the exterior of said fuse.

* * * * *